United States Patent [19]
Cheiky

[11] Patent Number: 5,432,022
[45] Date of Patent: Jul. 11, 1995

[54] COATED CATHODE FOR RECHARGEABLE METAL BATTERY

[75] Inventor: Michael C. Cheiky, Santa Barbara, Calif.

[73] Assignee: Dreisbach Electromotive Inc., Santa Barbara, Calif.

[21] Appl. No.: 150,487

[22] Filed: Nov. 12, 1993

[51] Int. Cl.⁶ .............................................. H01M 4/86
[52] U.S. Cl. ............................................. 429/27; 429/42
[58] Field of Search ............................ 429/27, 137, 42

[56] References Cited

U.S. PATENT DOCUMENTS

| | | | |
|---|---|---|---|
| 3,457,115 | 7/1969 | Kent | 136/86 |
| 3,607,422 | 9/1971 | Moran | 136/86 A |
| 4,047,894 | 9/1977 | Kühl | 23/284 |
| 4,054,725 | 10/1977 | Tuburaya | 429/29 |
| 4,118,544 | 10/1978 | Przybyla et al. | 429/27 |
| 4,177,327 | 10/1979 | Mathews et al. | 429/27 |
| 4,557,983 | 12/1985 | Sauer | 429/27 |
| 4,591,539 | 5/1986 | Oltman et al. | 429/27 |
| 4,894,295 | 1/1990 | Cheiky | 429/77 |
| 4,913,983 | 4/1990 | Cheiky | 429/13 |
| 4,916,036 | 4/1990 | Cheiky | 429/127 |
| 4,957,826 | 9/1990 | Cheiky | 429/27 |
| 5,306,528 | 4/1994 | Ohashi et al. | 429/27 |

Primary Examiner—Stephen Kalafut
Attorney, Agent, or Firm—Renner, Otto, Boisselle & Sklar

[57] ABSTRACT

An improved cathode is described which comprises an air-permeable, top coat deposited on the face of the cathode current collector screen. The top coat contains a $CO_2$ absorber such as magnesium hydroxide which absorbs $CO_2$ from the air and prevents $CO_2$ from reacting with or neutralizing the electrolyte. The layer is composed of a dispersion of metal hydroxide in a hydrophobic binder such as polytetrafluoroethylene. The top coat is preferably formed of a first, outer gas flow limiting layer of hydrophobic material absent any $CO_2$ absorber and a second, inner layer adjacent the current collector of hydrophobic binder containing a $CO_2$ absorber.

21 Claims, 1 Drawing Sheet

COATED CATHODE FOR RECHARGEABLE METAL BATTERY

TECHNICAL FIELD

The present invention generally relates to an air cathode and, more particularly, the present invention relates to a coated air cathode for a rechargeable metal battery.

BACKGROUND OF THE INVENTION

Metal-air batteries including zinc-air batteries offer the advantage of lightweight and very high energy densities (up to 300 WHr/Kg) over known conventional batteries such as the lead-acid type employed in automotive vehicles. Zinc-air batteries can be manufactured on a commercial production basis at low cost and with a high degree of safety. However, commercial applications of zinc-air batteries have previously been limited to primary or non-rechargeable type of batteries. Experimental rechargeable zinc-air batteries have been built for use in automotive applications. These batteries use an excess of liquid electrolyte stored in a reservoir. They usually include a pump to recirculate the electrolyte. Such systems are impractical for miniature consumer applications ranging from radios to portable computers because of their mechanical complexity and lack of leak resistance. If the battery is cut, electrolytes will be discharged from the reservoir.

A zinc-air battery generally includes a porous zinc anode, an air cathode formed of a carbon-containing membrane, and a porous material containing a liquid electrolyte which is sandwiched between the anode and cathode. A major problem which has existed in the development of rechargeable zinc-air batteries is that oxygen gas which is generated by the anode during the charging cycle, forces electrolyte accumulated above and anode upwardly into and through the air cathode. This results in loss of electrolyte and contamination of electrolyte through reaction with the atmosphere and catalyst in the air cathode. Water in the electrolyte evaporates through the porous cathode requiring provision for excess electrolyte stored in reservoirs.

These leaking problems are avoided by use of an anode wrapped in a porous separator cloth as disclosed in U.S. Pat. No. 4,957,826, the disclosure of which is expressly incorporated herein by reference. All the electrolyte is contained in the separator cloth. There is no electrolyte reservoir. The construction of the cell is simplified and the cell does not leak even when cut in half. The battery can be used in any orientation.

Another major problem with current metal-air batteries is the tendency of the air cathode to separate from the electrolyte material over the lifetime of the battery, resulting in the formation of air pockets between the air cathode and the electrolyte. As the metal anode reacts with the electrolyte during battery operation, a metal oxide or a metal hydroxide is formed. The metal oxide or metal hydroxide has a much larger volume than the metal electrode. The increased volume places pressure on the internal walls of the battery container resulting in an expansion of the container itself. This expansion in turn results in a separation of the air cathode membrane from the electrolyte, and the creation of the air pockets between the air cathode and the electrolyte. The air pockets substantially interfere with the battery output, and result in premature degradation of the battery.

The use of a battery cell case as disclosed in U.S. Pat. No. 4,894,295 prevents leakage or separation of the layers of the cell. The cell case has a concave bottom in contact with the anode. As the metal anode is oxidized and expands during discharge, the flexible case flexes to accommodate expansion.

The flexing of the bottom wall also applies pressure to the porous-electrolyte laden sheet enveloping the anode which pumps the liquid electrolyte upwardly into the upper layer of the porous sheet adjacent the cathode as disclosed in U.S. Pat. No. 4,913,983. This action of the flexible battery case eliminates the need for complex mechanical pumping of electrolyte within the cell.

The large energy to weight advantage of metal/air batteries is due to the absence of internal oxidized cathode material within the cell. The cathodic action is provided by air depolarization by the porous cathode. The air breathing nature of these cathodes exposes the internal components of the battery to the air environment. Thus, water vapor and carbon dioxide can freely pass through the cathode into the electrolyte. The cell will gain or lose water depending on the humidity and temperature of the ambient air and the battery and the hygroscopic nature of the electrolyte. Furthermore, basic electrolytes such as metal hydroxides which are typically used in zinc-air batteries, will react with atmospheric $CO_2$. The acidic carbonic acid formed on dissolving $CO_2$ in the electrolyte will eventually neutralize the basic electrolyte. This drastically reduces the conductivity of the electrolyte and reduces the output and limits the useful lifetime of the battery.

Transport of water vapor and $CO_2$ into the cell through the porous cathode is even more detrimental to a secondary or rechargeable battery. The bifunctional cathode utilized in a secondary battery must be capable of expelling oxygen to the exterior of the cell during recharge. The cathode must maintain the ability to breathe easily in both directions even after many cycles of charge and discharge.

The typical cathode used in secondary metal-air battery utilizes a layer of porous carbon-filled hydrophobic polymer deposited on a porous substrate such as a screen. A catalyst layer is disposed on the other sided of the screen. The carbon pore structure degrades and becomes more porous as the cathode is subjected to repeated alternating cycles of oxidation and reduction during discharge and recharge cycles. This leads to increased air flow and may eventually lead to electrolyte weepage as the pores becomes large enough to allow liquid flow.

The effects caused by degradation of the cathode are minimized by utilizing an air chamber above the cathode through which air flows across the cathode and by the use of selectively closable ports to the chamber to form an air-tight enclosure which isolates the cell from air when not in use as disclosed in U.S. Pat. No. 4,894,295 entitled METAL-ALLOY AIR BATTERY, granted Jan. 16, 1990, the disclosure of which is expressly incorporated herein by reference.

SUMMARY OF THE INVENTION

An improved cathode for a metal-air battery is described which comprises a conductive, air permeable current collector, and a gas-permeable top coat deposited on the outer surface of the cathode containing a material capable of absorbing $CO_2$ from air.

DETAILED DESCRIPTION OF THE INVENTION

The present invention protects a metal-air battery from the effects of $CO_2$ in the atmosphere. This greatly extends the lifetime of the battery and prevents reduction in output due to neutralization of the electrolyte. The metal-air battery of the invention exhibits even gas diffusion rate throughout its cycle life and does not weep electrolyte even after massive oxidation damage to the catalytically active cathode layer.

The metal-air battery is protected against the effects of $CO_2$ by incorporating a $CO_2$ gettering agent into a layer deposited on the top of the cathode. The gettering agent is preferably embedded in a hydrophobic binder material to form a gas-permeable layer deposited on the current collector. In a preferred configuration a gas diffusion layer is formed on top of the $CO_2$ absorbing layer. The pore size and thickness of the diffusion layer are selected to regulate air flow. This permits the air flow to the cathode to be selected independent of the gas diffusion rate of the catalytically active diffusion layer of the cathode positioned below the screen. The lower face of the cathode must also accommodate the electrolyte interface and the layer of catalyst.

Moreover, since the layer of coating is disposed above the electric field of the current collector screen, it does not participate in the catalytic cathodic reaction and is not subject to oxidation or reduction. Thus the $CO_2$ gettering layer can regulate gas diffusion through the cathode and prevent liquid from leaking from the battery irrespective of the condition of the catalyst layer or the remainder of the battery cell.

The cathode top coat of the invention is preferably formed in two layers—a first layer adjacent the screen which contains the $CO_2$ gettering agent dispersed within a hydrophobic binder and a second, outer gas diffusion layer. The outer layer regulates the air flow. This allows the absorption layer to absorb $CO_2$ from a slower moving gas stream. This isolates the cell electrolyte from $CO_2$ until the $CO_2$ getter is saturated. The preferred $CO_2$ gettering agents are metal hydroxides such as calcium hydroxide, magnesium hydroxide and lanthanum hydroxide. The latter two hydroxides are preferred since they are not very hygroscopic.

These and many other features and attendant advantages of the invention will become apparent as the invention becomes better understood by reference to the following detailed description when considered in conjunction with the accompanying drawings.

Figure 1:
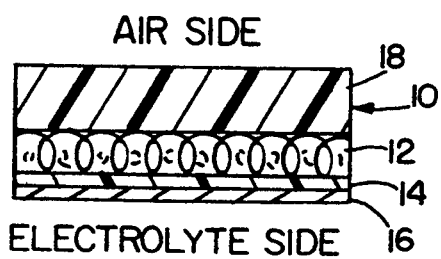
FIG. 1 is a view in cross-section of a cathode containing the novel $CO_2$ gettering or absorbing or scrubbing layer of the invention.

Referring now to FIG. 1 the cathode 10 comprises a gas permeable current collector 12 such as a screen or an expanded metal mesh. A gas diffusion layer 14 and catalyst layer 16 are applied to the bottom surface of the current collector 12, and the catalyst layer 16 faces the electrolyte of the cell, not shown. The top surface 18 comprises a gas permeable top coat layer of hydrophobic binder materials containing a dispersion of a $CO_2$ absorber. The layer 18 can be applied to the surface of existing air cathodes for metal-air batteries to improve their performance.

The layer 18 can be applied by painting a film of a dispersion of the $CO_2$ gettering agent in solvent onto the top surface of the current collector 12 followed by evaporation of the solvent. The layer 18 could also be formed by silk screening, rolling or trowelling a dispersion of $CO_2$ absorber onto the surface of an existing cathode either before or after the cathode undergoes pressure and/or thermal sintering to form the air diffusion and catalytic layers. The $CO_2$ absorbing layers will cure and/or sinter during processing of the cathode. If the $CO_2$ absorbing layer is applied to a manufactured cathode, the layer is subjected to a separate curing step.

The $CO_2$ getter or absorber can be a metal hydroxide. Calcium hydroxide is a very efficient absorber of carbon dioxide. However, calcium hydroxide is hygroscopic. Non-hygroscopic $CO_2$ absorbing metal hydroxides such as magnesium hydroxide and tantalum hydroxide are preferred. The hydrophobic binder can be a resin such as a hydrocarbon or a halogenated hydrocarbon resin, preferably a fluorinated hydrocarbon resin. Representative resins are polytetrafluoroethylene (PTFE), polytrifluoroethylene, polytrifluorochloroethylene, polyvinylfluoride, polyethylene, polypropylene and mixtures thereof and copolymers thereof. The porosity of the layers is from 5% to 90%, preferably 20% to 80%, and the pore size is from 0.01 to 10 microns. The thickness of the top coat is generally from 3 to 150 mils, usually about 25 to 75 mils.

The electrolyte side of the cathode contains the normal gas diffusion layer 14, and catalytic layer 16. The gas diffusion layer 14 can be formed from any of the hydrophobic resins discussed above. The gas diffusion layer 14 usually contains from 30% to 60% by weight of carbon. The gas diffusion layer 14 may also contain a dispersion of catalyst such as carbon, cobalt, platinum, palladium, aluminum, magnesium, nickel, silver or gold. The catalyst is usually provided as a layer 16 on the inside surface of the gas diffusion layer 14. This allows 2 step oxidation of the anode metal by means of the layer of metal catalyst and the carbon contained in the gas diffusion membrane which are both within the electric field of the battery cell. The current collector can be any conductive metal that is inert to the electrochemical environment of the battery. Usually the current collector can be formed of nickel, titanium, zirconium or tungsten.

The $CO_2$ absorbing layer 18 generally contains from 20% to 50% by weight of a $CO_2$ absorber such as magnesium hydroxide. The layer may optionally contain from 30% to 60% by weight of a carbon black filler such as acetylene black. Both top coat layers may optionally contain other additives such as inert pore formers which are evaporated or dissolved during formation of the layer. Reinforcing fibers such as fiberglass or graphite fibers can be present to improve the strength and durability of either or both layers.

The acetylene black in conjunction with the hydrophobic resin forms a bulk gas diffusion membrane 14. The layer is preferably formed by sintering a mixture of particles of the resin, carbon black and the metal hydroxide. The presintered $CO_2$ absorbing and resin materials preferably have particle sizes in the range of 100 nm to 10 microns, preferably about 0.1 to 5 microns, with 1 micron particle being optimum. Ranges of preferred materials for the $CO_2$ absorbing layer 18 are provided in the following table.

TABLE 1

| Material, Parts by Weight | Range | Example |
| --- | --- | --- |
| Acetylene Black | 30–60% | 47% |
| PTFE | 15–40% | 21% |
| Metal Hydroxide | 20–50% | 26% |

Figure 2:
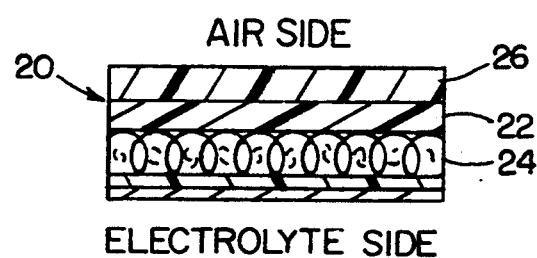
FIG. 2 is a view in section of further embodiment of cathode containing a $CO_2$ scrubbing layer in accordance with the invention.

The $CO_2$ absorption of layer 18 can be enhanced by the embodiment illustrated in FIG. 2. The cathode top coat 20 illustrated in this embodiment comprises a first $CO_2$ absorbing layer 22 deposited on the current collector 24 and a bulk diffusion layer 26 on top of the first layer 22. The layers are formed of a porous hydrophobic material such as the materials used for the $CO_2$ absorbing layer and may also contain from 30% to 70% of a porous carbon filler such as acetylene black. The thickness of the composite top coat 20 is similar to the thickness of the $CO_2$ layer described above—the first and second layers each forming about one half the thickness of the top coat.

Preferred materials for use in the bulk gas diffusion layer are provided in the following table.

TABLE 2

| Material, Parts by Weight | Range | Example |
| --- | --- | --- |
| Acetylene Black | 50–70% | 64% |
| PTFE | 20–40% | 28% |

Figure 3:
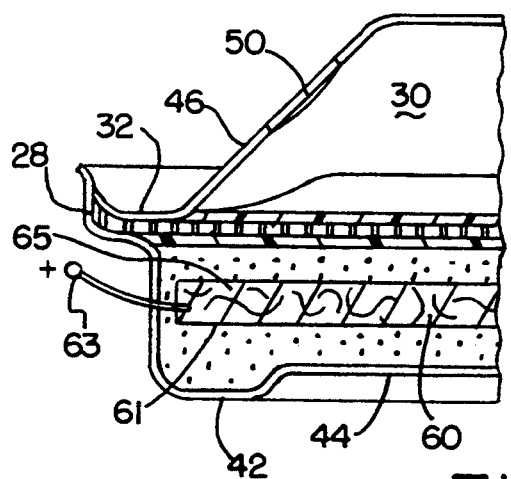
FIG. 3 is a view in section of a metal-air battery containing a catalyst having a $CO_2$ absorbing top coat.
Figure 3:
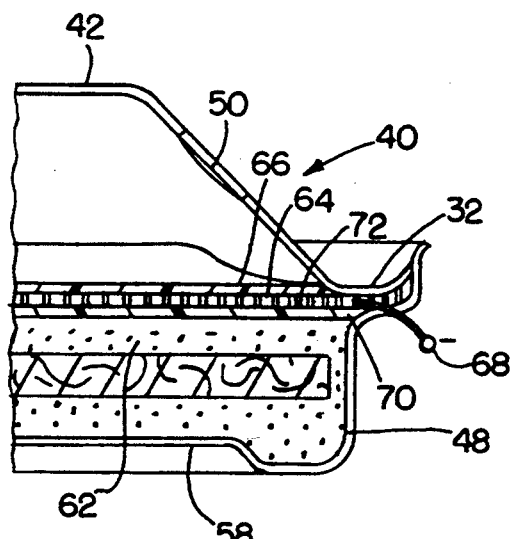

Referring now to FIG. 3 of the drawings, a rechargeable zinc-air battery 40 embodying the present invention includes a casing or container 42 made of an inert plastic or other suitable material. The container 42 has an upwardly convex bottom 44, a lid or top 46, and side walls 48. The top 46 encloses an air chamber 30 and is formed with ports 50 which permit flow of air into and out of the battery during charging and discharging cycles thereof. The purpose of making the bottom 44 convex is to resiliently press the component elements of the battery together.

The battery 40 further includes an anode 60 comprising an electrically conductive plate or mesh screen 61. A lead 63 extends outwardly from the mesh screen 61 to provide a positive terminal connection for the battery. The screen 61 may be formed of expanded metal or foamed metal, with a mesh size of 20 to 80. The material of the screen 61 may be iron, tin, titanium, or other non-corrosive metal or plating of these metals on an economical substrate.

A porous zinc material 65 is packed into the mesh screen 61. The zinc material 65 may be zinc powder, flakes, granules, capsules, or fibers packed to a semipermeable density. Various corrosion inhibitors and paste forming additives may be added to the zinc material 65 to improve the performance of the battery, if desired.

The anode 60 is completely wrapped in a porous anode separator 62 formed of an absorbent, oxidation resistant woven or non-woven cloth of cotton, rayon, nylon, modified CMC and/or wettable plastic fibers. The anode separator 62 may also include inert spacer and/or filler materials. As viewed in FIG. 3, the anode separator 62 has a first or upper layer, a second or lower layer, and side or edge layers which interconnect the upper and lower layers.

A liquid electrolyte required for operation of the battery is contained in the anode separator 62. The electrolyte may be a simple or mixed aqueous base such as LiOH, NaOH, KOH, CsOH, etc. in the range of one molar to saturation.

The battery 40 also includes the air cathode 64 in the form of a carbon membrane or similar material with a high affinity for oxygen. The air cathode 64 contains the $CO_2$ absorbing, gas diffusion limiting top coat 66 of the invention. The air cathode 64 has a lead 68 extending outwardly therefrom to provide a negative terminal for the battery.

The battery 40 may contain a cathode gel member 70 including a chemically inert mesh screen 72 which serves as a spacing and retaining member. An oxidation and corrosion resistant hydro-gel material such as CMC or related derivatives in a concentrated base such as LiOH, NaOH, KOH, or CsOH can be packed into the mesh of the screen 72. The anode 60, cathode gel member 70 and air cathode are sandwiched together inside the container 42 under resilient pressure from the convex bottom 44 thereof as described above.

During discharge of the battery 40, the zinc material 65 in the anode 60 is converted to zinc oxide which has a lower density, and expands to a larger volume than zinc. The expanding zinc oxide material 65 applies mechanical pressure to the surrounding porous anode separator 62 causing liquid electrolyte to be released therefrom. This pumping sustains chemical reaction with the anode 60 and air cathode 64 which results in the generation of electrical current which is conducted through the leads 63 and 68 to a load, not shown. The mechanical pressure applied by the convex bottom 44 of the container prevents separation of the enclosed elements of the battery and the formation of air pockets below the air cathode 64. The cathode gel member 70 provides chemical reactive communication between the electrolyte in the anode separator 62 and the air cathode 64, and is sufficiently permeable to oxygen to allow oxygen to flow therethrough as required by the charging and discharging cycles of the battery.

During charging of the battery 40, the zinc material 65, which was converted to zinc oxide during discharge, generates oxygen gas which rises through the anode separator 62 and attempts to push electrolyte accumulated at the interface of the upper layer of the separation and the cathode gel member 70 upwardly through the air cathode 64 and out of the battery 40. Although permeable to oxygen, the gel material 70 prevents diffusion of electrolyte into the air cathode 64. The permeability of the gel member 70 to oxygen is selected such that during charging of the battery 40, sufficient oxygen pressure is created at the interface of the upper layer of the anode separator 62 and the cathode gel member 70 to force liquid electrolyte to flow downwardly through the edges of the anode separator 62 into the lower layer thereof. This recirculation ensures that sufficient electrolyte will be present in the lower layer of the separator for use in the next discharge cycle of the battery.

The air cathode member 64 fits into ledge 28 and is held in place during battery discharge by channels 32. Above air cathode membrane 64 is an air chamber 30, which is enclosed by the lid 46. The lid 46 has two air ports 50, either one of which may serve as an inlet with the other serving as an outlet for a flow of air through the air chamber 30 and across the air cathode membrane 64. The purpose of the air flow is to provide a continuous supply of oxygen required for battery operation. The battery also has a negative terminal 63 connected to anode 60, and a positive terminal 68 connected to air cathode membrane 64.

After the internal battery components have been placed within the base, the lid is fitted within ledge 28, and the lid and the base are bonded together by any one of a number of processes, including heat.

During discharge of the battery, the metal electrode 60 reacts with electrolyte to form a metal oxide or a metal hydroxide compound. This compound has a lower density and a larger volume than the base metal used for the anode electrode 60. The larger volume requirement creates a pressure upon the internal walls of the battery container which flex the convex lower wall upwardly against electrolyte separator 62. This pressure forces the separator 62 into strong contact with air cathode membrane 64, thereby avoiding the problem of separation of the electrolyte and the air cathode layer during battery discharge.

A commercial air-metal battery was modified to contain a first layer of magnesium-hydroxide-PTFE-acetylene black and second outer layer of PTFE and acetylene black according to the Examples. The combined thickness of the 2 layers was 0.050 inches.

Two identical 140 g zinc-air cells with conventional air cathodes containing a carbon PTFE air diffusion membrane coated with a catalyst layer were operated under a 1 ohm load. The results follow:

TABLE 3

| | | Cycles above 0.9 V |
|---|---|---|
| Cell A | No top coat | 5 |
| Cell B | Containing a Top Coat of the invention as per the Example | 11 |

The battery containing the top coat of the invention could be recharged over twice as many times as a battery without a top coat before failure by leakage.

The battery of the invention can be recharged by means of the charging apparatus disclosed in my copending application Ser. No. 08/150,471 (Attorney Docket DEMI.P0106USA) filed the same day as this application, the disclosure of which is expressly incorporated herein by reference.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. An improved cathode for a metal-air battery comprising:
   a conductive, air-permeable current collector; and
   a gas-permeable top coat deposited on the outer surface of the cathode current collector, said top coat comprising a hydrophobic binder containing a dispersion of a material capable of absorbing $CO_2$ from air.

2. An improved cathode according to claim 1 in which the top coat comprises a first outer air flow regulating layer which does not contain any $CO_2$ absorbing material and a second, inner layer which contains the $CO_2$ absorbing material.

3. An improved cathode according to claim 1 in which the $CO_2$ absorbing material is a metal hydroxide.

4. An improved cathode according to claim 3 in which the metal hydroxide is selected from calcium hydroxide, magnesium hydroxide or lanthanum hydroxide.

5. An improved cathode according to claim 4 in which the metal hydroxide is non-hygroscopic.

6. An improved cathode according to claim 3 in which the hydrophobic binder is selected from hydrocarbon resins or halogenated hydrocarbon resins.

7. An improved cathode according to claim 6 in which the resin is a fluorinated hydrocarbon resin.

8. An improved cathode according to claim 7 in which the resin is a polytetrafluoroethylene.

9. An improved cathode according to claim 8 in which the top coat contains 15% to 40% by weight of polytetrafluoroethylene binder and 20% to 50% by weight of a metal hydroxide.

10. An improved cathode according to claim 9 in which the layer further includes from 30% to 70% by weight of carbon black.

11. An improved cathode according to claim 1 in which the porosity of the top coat from 5% to 90%.

12. An improved cathode according to claim 9 in which the pore size of the top coat is from 0.01 to 10 microns.

13. An improved cathode according to claim 1 in which the inner surface of the current collector contains a gas-diffusion layer.

14. An improved cathode according to claim 13 in which a layer of catalyst is deposited on said gas diffusion layer.

15. A metal-air battery comprising:
   a battery case containing:
      the cathode defined in claim 1;
      a liquid electrolyte; and
      an anode.

16. A battery according to claim 15 in which the anode is wrapped in a porous separator and the liquid electrolyte is absorbed into the separator.

17. A battery according to claim 16 in which the case contains a convex bottom which is in contact with the separator.

18. A battery according to claim 15 further including a lid defining an air flow chamber connected to said case with the cathode being disposed within the air chamber, said lid containing an inlet port and an outlet port.

19. A battery according to claim 18 in which the lid contains a top wall and side walls and said ports are located in said side walls.

20. An improved cathode for a metal-air battery comprising:
   a conductive, air permeable current collector; and
   a gas-permeable top coat having a porosity from 5% to 90% deposited on the outer surface of the cathode current collector, said top-coat comprising 15% to 40% by weight a hydrophobic binder resin selected from hydrocarbon resins and halogenated hydrocarbon resins, said binder resin containing 20% to 50% by weight of a dispersion of a metal hydroxide material capable of absorbing $CO_2$ from air.

21. A cathode according to claim 20 in which the top coat is formed by sintering a mixture of resin and metal hydroxide particles.

* * * * *